(12) United States Patent
Carlson

(10) Patent No.: US 10,304,127 B2
(45) Date of Patent: *May 28, 2019

(54) COMMUNICATION DEVICE INCLUDING MULTI-PART ALIAS IDENTIFIER

(71) Applicant: Visa International Services Association, San Francisco, CA (US)

(72) Inventor: Mark Carlson, Half Moon Bay, CA (US)

(73) Assignee: Visa International Service Association, San Francisco, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 15/627,019

(22) Filed: Jun. 19, 2017

(65) Prior Publication Data

US 2017/0286926 A1    Oct. 5, 2017

Related U.S. Application Data

(63) Continuation of application No. 12/437,416, filed on May 7, 2009, now Pat. No. 9,715,709.

(Continued)

(51) Int. Cl.
*G06Q 20/40* (2012.01)
*G06Q 20/32* (2012.01)
(Continued)

(52) U.S. Cl.
CPC ............ *G06Q 40/00* (2013.01); *G06Q 20/10* (2013.01); *G06Q 20/40* (2013.01); *H04L 63/083* (2013.01)

(58) Field of Classification Search
USPC .................. 705/44, 39, 42, 14.66, 76, 14.26
See application file for complete search history.

(56) References Cited

U.S. PATENT DOCUMENTS

| 3,356,021 A | 12/1967 | May et al. |
| 4,044,231 A | 8/1977 | Beck et al. |

(Continued)

FOREIGN PATENT DOCUMENTS

| EP | 1 096 439 A2 | 5/2001 |
| EP | 1 136 961 A1 | 9/2001 |

(Continued)

OTHER PUBLICATIONS

U.S. Appl. No. 13/153,301, filed Jun. 3, 2011, 101 pages.

*Primary Examiner* — Mark A Fleischer
(74) *Attorney, Agent, or Firm* — Kilpatrick Townsend & Stockton LLP

(57) ABSTRACT

Methods and systems are disclosed for allowing financial transactions to be conducted using consumer devices. In some embodiments, the consumer device is a mobile communication device, such as a mobile phone. A payer initiates a transaction by sending a payment request message from a mobile phone which specifies the payee and amount to be paid. Payees are identified by unique aliases, which are maintained in a database. The aliases, in turn, are comprised of multiple parts. Each part of the alias may identify a relevant aspect of the transaction. For example, one part of the alias may identify the payee and another part of the alias may identify the financial institution of the account of the payee. Methods for assembling the enrollment and alias database are included.

20 Claims, 6 Drawing Sheets

Related U.S. Application Data

(60) Provisional application No. 61/052,028, filed on May 9, 2008.

(51) Int. Cl.

| | | |
|---|---|---|
| *G06Q 20/38* | (2012.01) | |
| *G06Q 20/22* | (2012.01) | |
| *G06Q 20/20* | (2012.01) | |
| *G06Q 20/42* | (2012.01) | |
| *G06Q 40/00* | (2012.01) | |
| *G06Q 20/10* | (2012.01) | |
| *H04L 29/06* | (2006.01) | |

(56) References Cited

U.S. PATENT DOCUMENTS

| | | |
|---|---|---|
| 4,341,951 A | 7/1982 | Benton |
| 4,461,861 A | 7/1984 | Loffelman et al. |
| 4,613,904 A | 9/1986 | Lurie |
| 4,674,041 A | 6/1987 | Lemon et al. |
| 4,701,601 A | 10/1987 | Francini et al. |
| 4,755,872 A | 7/1988 | Bestler et al. |
| 4,868,376 A | 9/1989 | Lessin et al. |
| 5,008,930 A | 4/1991 | Gawrys et al. |
| 5,023,904 A | 6/1991 | Kaplan et al. |
| 5,034,597 A | 7/1991 | Atsumi et al. |
| 5,305,196 A | 4/1994 | Deaton et al. |
| 5,327,508 A | 7/1994 | Deaton et al. |
| 5,353,218 A | 10/1994 | DeLapa et al. |
| 5,359,183 A | 10/1994 | Skodlar |
| 5,383,113 A | 1/1995 | Kight et al. |
| 5,388,165 A | 2/1995 | Deaton et al. |
| RE34,915 E | 4/1995 | Nichtberger et al. |
| 5,420,606 A | 5/1995 | Begum et al. |
| 5,430,644 A | 7/1995 | Deaton et al. |
| 5,448,471 A | 9/1995 | Deaton et al. |
| 5,465,206 A | 11/1995 | Hilt et al. |
| 5,477,038 A | 12/1995 | Levine et al. |
| 5,483,444 A | 1/1996 | Heintzeman et al. |
| 5,485,510 A | 1/1996 | Colbert |
| 5,500,513 A | 3/1996 | Langhans et al. |
| 5,502,636 A | 3/1996 | Clarke |
| 5,530,438 A | 6/1996 | Bickham et al. |
| 5,564,073 A | 10/1996 | Takahisa |
| 5,577,266 A | 11/1996 | Takahisa et al. |
| 5,579,537 A | 11/1996 | Takahisa |
| 5,591,949 A | 1/1997 | Bernstein |
| 5,592,560 A | 1/1997 | Deaton et al. |
| 5,604,921 A | 2/1997 | Alanara |
| 5,615,110 A | 3/1997 | Wong |
| 5,621,201 A | 4/1997 | Langhans et al. |
| 5,621,812 A | 4/1997 | Deaton et al. |
| 5,627,549 A | 5/1997 | Park |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,659,165 A | 8/1997 | Jennings et al. |
| 5,659,469 A | 8/1997 | Deaton et al. |
| 5,675,662 A | 10/1997 | Deatron et al. |
| 5,678,939 A | 10/1997 | Ross |
| 5,687,322 A | 11/1997 | Deaton et al. |
| 5,708,422 A | 1/1998 | Blonder et al. |
| 5,710,886 A | 1/1998 | Christensen et al. |
| 5,717,866 A | 2/1998 | Naftzger |
| 5,729,460 A | 3/1998 | Plett et al. |
| 5,761,648 A | 6/1998 | Golden et al. |
| 5,777,903 A | 7/1998 | Piosenka et al. |
| 5,778,313 A | 7/1998 | Fougnies |
| 5,787,159 A | 7/1998 | Hamilton et al. |
| 5,791,991 A | 8/1998 | Small |
| 5,793,972 A | 8/1998 | Shane |
| 5,806,044 A | 9/1998 | Powell |
| 5,822,735 A | 10/1998 | De Lapa et al. |
| 5,855,007 A | 12/1998 | Jovicic et al. |
| 5,870,030 A | 2/1999 | DeLuca et al. |
| 5,884,277 A | 3/1999 | Khosla |
| 5,905,246 A | 5/1999 | Fajkowski |
| 5,907,830 A | 5/1999 | Engel et al. |
| 5,924,080 A | 7/1999 | Johnson |
| 5,937,396 A | 8/1999 | Konya |
| 5,945,652 A | 8/1999 | Ohki et al. |
| 5,959,577 A | 9/1999 | Fan et al. |
| 5,974,399 A | 10/1999 | Giuliani et al. |
| 5,991,748 A | 11/1999 | Taskett |
| 5,991,749 A | 11/1999 | Morrill et al. |
| 6,002,771 A | 12/1999 | Nielsen |
| 6,009,411 A | 12/1999 | Kepecs |
| 6,009,415 A | 12/1999 | Shurling et al. |
| 6,012,038 A | 1/2000 | Powell |
| 6,014,634 A | 1/2000 | Scroggie et al. |
| 6,018,718 A | 1/2000 | Walker et al. |
| 6,029,151 A | 2/2000 | Nikander |
| 6,035,280 A | 3/2000 | Christensen |
| 6,041,309 A | 3/2000 | Laor |
| 6,049,778 A | 4/2000 | Walker et al. |
| 6,055,505 A | 4/2000 | Elston |
| 6,062,991 A | 5/2000 | Moriarty et al. |
| 6,064,990 A | 5/2000 | Goldsmith |
| 6,067,526 A | 5/2000 | Powell |
| 6,067,529 A | 5/2000 | Ray et al. |
| 6,076,068 A | 6/2000 | DeLapa et al. |
| 6,076,069 A | 6/2000 | Laor |
| 6,076,101 A | 6/2000 | Kamakura et al. |
| RE36,788 E | 7/2000 | Mansvelt et al. |
| 6,128,599 A | 10/2000 | Walker et al. |
| 6,169,974 B1 | 1/2001 | Baumgartner, Jr. et al. |
| 6,185,290 B1 | 2/2001 | Shaffer et al. |
| 6,185,541 B1 | 2/2001 | Scroggie et al. |
| 6,227,447 B1 | 5/2001 | Campisano |
| 6,237,145 B1 | 5/2001 | Narasimhan et al. |
| 6,247,129 B1 | 6/2001 | Keathley et al. |
| 6,267,292 B1 | 7/2001 | Walker et al. |
| 6,279,112 B1 | 8/2001 | O'Toole, Jr. et al. |
| 6,292,786 B1 | 9/2001 | Deaton et al. |
| 6,295,522 B1 | 9/2001 | Boesch |
| 6,307,958 B1 | 10/2001 | Deaton et al. |
| 6,318,631 B1 | 11/2001 | Halperin |
| 6,321,208 B1 | 11/2001 | Barnett et al. |
| 6,330,543 B1 | 12/2001 | Kepecs |
| 6,330,550 B1 | 12/2001 | Brisebois et al. |
| 6,334,108 B1 | 12/2001 | Deaton et al. |
| 6,336,098 B1 | 1/2002 | Fortenberry et al. |
| 6,336,099 B1 | 1/2002 | Barnett et al. |
| 6,341,724 B2 | 1/2002 | Campisano |
| 6,351,735 B1 | 2/2002 | Deaton et al. |
| 6,377,935 B1 | 4/2002 | Deaton et al. |
| 6,378,775 B2 | 4/2002 | Hayashida |
| 6,381,324 B1 | 4/2002 | Shaffer et al. |
| 6,418,420 B1 | 7/2002 | DiGiorgio et al. |
| 6,424,949 B1 | 7/2002 | Deaton et al. |
| 6,424,951 B1 | 7/2002 | Shurling et al. |
| 6,434,534 B1 | 8/2002 | Walker et al. |
| 6,439,456 B1 | 8/2002 | Bangal et al. |
| 6,470,181 B1 | 10/2002 | Maxwell |
| 6,484,146 B2 | 11/2002 | Day et al. |
| 6,488,203 B1 | 12/2002 | Stoutenburg et al. |
| 6,505,046 B1 | 1/2003 | Baker |
| 6,516,302 B1 | 2/2003 | Deaton et al. |
| 6,529,725 B1 | 3/2003 | Joao et al. |
| 6,535,855 B1 | 3/2003 | Cahill et al. |
| 6,560,581 B1 | 5/2003 | Fox et al. |
| 6,584,309 B1 | 6/2003 | Whigham |
| 6,587,835 B1 | 7/2003 | Treyz et al. |
| 6,594,376 B2 | 7/2003 | Hoffman et al. |
| 6,601,759 B2 | 8/2003 | Fife et al. |
| 6,609,104 B1 | 8/2003 | Deaton et al. |
| 6,611,811 B1 | 8/2003 | Deaton et al. |
| 6,612,487 B2 | 9/2003 | Tidball et al. |
| 6,631,849 B2 | 10/2003 | Blossom |
| 6,647,257 B2 | 11/2003 | Owensby |
| 6,647,269 B2 | 11/2003 | Hendrey et al. |
| 6,664,948 B2 | 12/2003 | Crane et al. |
| 6,684,195 B1 | 1/2004 | Deaton et al. |

(56) References Cited

U.S. PATENT DOCUMENTS

| | | |
|---|---|---|
| 6,685,093 B2 | 2/2004 | Challa et al. |
| 6,736,322 B2 | 5/2004 | Gobburu et al. |
| 6,747,547 B2 | 6/2004 | Benson |
| 6,749,118 B2 | 6/2004 | Kobayashi et al. |
| 6,769,605 B1 | 8/2004 | Magness |
| 6,775,539 B2 | 8/2004 | Deshpande |
| 6,832,721 B2 | 12/2004 | Fujii |
| 6,837,425 B2 | 1/2005 | Gauthier et al. |
| 6,868,391 B1 | 3/2005 | Hultgren |
| 6,877,665 B2 | 4/2005 | Challa et al. |
| 6,912,398 B1 | 6/2005 | Domnitz |
| 6,920,611 B1 | 7/2005 | Spaeth et al. |
| 6,975,852 B1 | 12/2005 | Sofer et al. |
| 6,982,941 B2 | 1/2006 | Yamanoi et al. |
| 6,990,330 B2 | 1/2006 | Veerepalli et al. |
| 7,003,493 B2 | 2/2006 | Weichert et al. |
| 7,003,497 B2 | 2/2006 | Maes |
| 7,007,840 B2 | 3/2006 | Davis |
| 7,013,286 B1 | 3/2006 | Aggarwal et al. |
| 7,025,256 B1 | 4/2006 | Drummond et al. |
| 7,028,906 B2 | 4/2006 | Challa et al. |
| 7,039,611 B2 | 5/2006 | Devine |
| 7,040,533 B1 | 5/2006 | Ramachandran |
| 7,051,923 B2 | 5/2006 | Nguyen et al. |
| 7,055,031 B2 | 5/2006 | Platt |
| 7,076,329 B1 | 7/2006 | Kolls |
| 7,089,208 B1 | 8/2006 | Levchin et al. |
| 7,099,850 B1 | 8/2006 | Mann et al. |
| 7,104,446 B2 | 9/2006 | Bortolin et al. |
| 7,107,250 B2 | 9/2006 | Harrison |
| 7,110,954 B2 | 9/2006 | Yung et al. |
| 7,121,456 B2 | 10/2006 | Spaeth et al. |
| 7,124,937 B2 | 10/2006 | Myers et al. |
| 7,150,393 B1 | 12/2006 | Drummond et al. |
| 7,152,780 B2 | 12/2006 | Gauthier et al. |
| 7,159,770 B2 | 1/2007 | Onozu et al. |
| 7,194,437 B1 | 3/2007 | Britto et al. |
| 7,201,313 B1 | 4/2007 | Ramachandran |
| 7,203,300 B2 | 4/2007 | Shaffer et al. |
| 7,207,477 B1 | 4/2007 | Ramachandran |
| 7,213,755 B2 | 5/2007 | Newsome et al. |
| 7,231,357 B1 | 6/2007 | Shanman |
| RE39,736 E | 7/2007 | Morrill, Jr. |
| 7,231,372 B1 | 7/2007 | Prange et al. |
| 7,243,853 B1 | 7/2007 | Levy et al. |
| 7,257,545 B1 | 8/2007 | Hung |
| 7,264,152 B2 | 9/2007 | Tsuei |
| 7,280,981 B2 | 10/2007 | Huang et al. |
| 7,290,704 B1 | 11/2007 | Ball et al. |
| 7,308,254 B1 | 12/2007 | Rissanen |
| 7,343,149 B2 | 3/2008 | Benco et al. |
| 7,350,702 B2 | 4/2008 | Bortolin et al. |
| 7,353,187 B1 | 4/2008 | Emodi et al. |
| 7,356,516 B2 | 4/2008 | Richey et al. |
| 7,357,310 B2 | 4/2008 | Calabrese et al. |
| 7,376,629 B1 | 5/2008 | McIsaac et al. |
| 7,395,241 B1 | 7/2008 | Cook et al. |
| 7,407,094 B2 | 8/2008 | Myers et al. |
| 7,415,442 B1 | 8/2008 | Battaglini et al. |
| 7,440,771 B2 | 10/2008 | Purk |
| 7,447,662 B2 | 11/2008 | Gibson |
| 7,454,232 B2 | 11/2008 | Abuhamdeh |
| 7,464,867 B1 | 12/2008 | Kolls |
| 7,610,222 B2 | 10/2009 | Neofytides et al. |
| 7,653,599 B2 | 1/2010 | Doran et al. |
| 7,848,980 B2 | 12/2010 | Carlson |
| 8,015,116 B2 * | 9/2011 | Crandell ............ G06F 21/31 705/64 |
| 2001/0013542 A1 | 8/2001 | Horowitz et al. |
| 2002/0013711 A1 | 1/2002 | Ahuja et al. |
| 2002/0062249 A1 | 5/2002 | Iannacci et al. |
| 2002/0065713 A1 | 5/2002 | Awada et al. |
| 2002/0091569 A1 | 7/2002 | Kitaura et al. |
| 2002/0128903 A1 | 9/2002 | Kernahan |
| 2002/0128967 A1 | 9/2002 | Meyer et al. |
| 2002/0152168 A1 | 10/2002 | Neofytides et al. |
| 2002/0161701 A1 | 10/2002 | Warmack |
| 2002/0165775 A1 | 11/2002 | Tagseth et al. |
| 2002/0169719 A1 | 11/2002 | Dively et al. |
| 2002/0174016 A1 | 11/2002 | Cuervo |
| 2002/0190118 A1 | 12/2002 | Davenport et al. |
| 2002/0198777 A1 | 12/2002 | Yuasa |
| 2003/0004808 A1 | 1/2003 | Elhaoussine |
| 2003/0028599 A1 | 2/2003 | Kolsky |
| 2003/0058261 A1 | 3/2003 | Challa et al. |
| 2003/0061162 A1 | 3/2003 | Matthews |
| 2003/0105710 A1 | 6/2003 | Barbara et al. |
| 2003/0120593 A1 | 6/2003 | Bansal et al. |
| 2003/0126078 A1 | 7/2003 | Vihinen |
| 2003/0126094 A1 | 7/2003 | Fisher et al. |
| 2003/0130940 A1 | 7/2003 | Hansen et al. |
| 2003/0144907 A1 | 7/2003 | Cohen et al. |
| 2003/0172040 A1 | 9/2003 | Kemper et al. |
| 2003/0208406 A1 | 11/2003 | Okamoto et al. |
| 2003/0212595 A1 | 11/2003 | Antonucci |
| 2003/0212642 A1 | 11/2003 | Weller et al. |
| 2003/0225618 A1 | 12/2003 | Hessburg et al. |
| 2003/0230630 A1 | 12/2003 | Whipple et al. |
| 2003/0233292 A1 | 12/2003 | Richey et al. |
| 2004/0019522 A1 | 1/2004 | Bortolin et al. |
| 2004/0039693 A1 | 2/2004 | Nauman et al. |
| 2004/0044621 A1 | 3/2004 | Huang et al. |
| 2004/0049455 A1 | 3/2004 | Mohsenzadeh |
| 2004/0050922 A1 | 3/2004 | Gauthier et al. |
| 2004/0054575 A1 | 3/2004 | Marshall |
| 2004/0054581 A1 | 3/2004 | Redford et al. |
| 2004/0054590 A1 | 3/2004 | Redford et al. |
| 2004/0054591 A1 | 3/2004 | Spaeth et al. |
| 2004/0064406 A1 | 4/2004 | Yates et al. |
| 2004/0098307 A1 | 5/2004 | Tsuyoshi et al. |
| 2004/0117254 A1 | 6/2004 | Nemirofsky et al. |
| 2004/0133653 A1 | 7/2004 | Defosse et al. |
| 2004/0139021 A1 | 7/2004 | Reed et al. |
| 2004/0148224 A1 | 7/2004 | Gauthier et al. |
| 2004/0153715 A1 | 8/2004 | Spaeth, I et al. |
| 2004/0158534 A1 | 8/2004 | Azami et al. |
| 2004/0188515 A1 | 9/2004 | Jimenez |
| 2004/0199470 A1 | 10/2004 | Ferry, Jr. et al. |
| 2004/0220964 A1 | 11/2004 | Shiftan et al. |
| 2004/0243519 A1 | 12/2004 | Perttila et al. |
| 2004/0254848 A1 | 12/2004 | Golan et al. |
| 2004/0260653 A1 | 12/2004 | Tsuei et al. |
| 2005/0021456 A1 | 1/2005 | Steele et al. |
| 2005/0029344 A1 | 2/2005 | Davis |
| 2005/0035847 A1 | 2/2005 | Bonalle et al. |
| 2005/0036611 A1 | 2/2005 | Seaton, Jr. et al. |
| 2005/0027543 A1 | 3/2005 | LaBrou et al. |
| 2005/0045718 A1 | 3/2005 | Bortolin et al. |
| 2005/0058427 A1 | 3/2005 | Nguyen et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0071235 A1 | 3/2005 | Nguyen et al. |
| 2005/0075958 A1 | 4/2005 | Gonzalez |
| 2005/0080197 A1 | 4/2005 | Jana et al. |
| 2005/0080697 A1 | 4/2005 | Foss et al. |
| 2005/0097473 A1 | 5/2005 | Malik et al. |
| 2005/0102233 A1 | 5/2005 | Park et al. |
| 2005/0102234 A1 | 5/2005 | Devine |
| 2005/0121506 A1 | 6/2005 | Gauthier et al. |
| 2005/0131816 A1 | 6/2005 | Britto et al. |
| 2005/0149455 A1 | 7/2005 | Bruesewitz et al. |
| 2005/0177510 A1 | 8/2005 | Hilt et al. |
| 2005/0199714 A1 | 9/2005 | Brandt et al. |
| 2005/0209958 A1 | 9/2005 | Michelsen et al. |
| 2005/0210387 A1 | 9/2005 | Alagappan et al. |
| 2005/0219061 A1 | 10/2005 | Lai et al. |
| 2005/0222933 A1 | 10/2005 | Wesby |
| 2005/0246293 A1 | 11/2005 | Ong |
| 2005/0250538 A1 | 11/2005 | Narasimhan et al. |
| 2005/0283416 A1 | 12/2005 | Reid et al. |
| 2005/0283430 A1 | 12/2005 | Reid et al. |
| 2005/0283431 A1 | 12/2005 | Reid et al. |

(56) References Cited

U.S. PATENT DOCUMENTS

| | | | |
|---|---|---|---|
| 2005/0283432 A1 | 12/2005 | Reid et al. |
| 2005/0283433 A1 | 12/2005 | Reid et al. |
| 2006/0006224 A1 | 1/2006 | Vikram |
| 2006/0053056 A1 | 3/2006 | Alspach et al. |
| 2006/0059110 A1 | 3/2006 | Madhok et al. |
| 2006/0080243 A1 | 4/2006 | Kemper et al. |
| 2006/0085260 A1 | 4/2006 | Yamagishi |
| 2006/0111967 A1 | 5/2006 | Forbes |
| 2006/0122881 A1 | 6/2006 | Walker et al. |
| 2006/0155644 A1 | 7/2006 | Reid et al. |
| 2006/0163345 A1 | 7/2006 | Myers et al. |
| 2006/0178957 A1 | 8/2006 | LeClaire |
| 2006/0179007 A1 | 8/2006 | Davis |
| 2006/0202025 A1 | 9/2006 | Calabrese et al. |
| 2006/0206376 A1 | 9/2006 | Gibbs et al. |
| 2006/0218086 A1 | 9/2006 | Campbell et al. |
| 2006/0224449 A1 | 10/2006 | Byerley et al. |
| 2006/0248007 A1 | 11/2006 | Hofer et al. |
| 2006/0253390 A1 | 11/2006 | McCarthy et al. |
| 2006/0270421 A1 | 11/2006 | Phillips et al. |
| 2006/0282382 A1 | 12/2006 | Balasubramanian et al. |
| 2006/0290501 A1 | 12/2006 | Hammad et al. |
| 2006/0293027 A1 | 12/2006 | Hammad et al. |
| 2007/0001000 A1 | 1/2007 | Nguyen et al. |
| 2007/0001001 A1 | 1/2007 | Myers et al. |
| 2007/0005613 A1 | 1/2007 | Singh et al. |
| 2007/0005774 A1 | 1/2007 | Singh et al. |
| 2007/0012764 A1 | 1/2007 | Bortolin et al. |
| 2007/0017970 A1 | 1/2007 | Gauthier et al. |
| 2007/0027803 A1 | 2/2007 | Brandes et al. |
| 2007/0027820 A1 | 2/2007 | Elharar |
| 2007/0027920 A1 | 2/2007 | Elharar |
| 2007/0034679 A1 | 2/2007 | Gauthier et al. |
| 2007/0045401 A1 | 3/2007 | Sturm |
| 2007/0055597 A1 | 3/2007 | Patel et al. |
| 2007/0055630 A1 | 3/2007 | Gauthier et al. |
| 2007/0057034 A1 | 3/2007 | Gauthier et al. |
| 2007/0057043 A1 | 3/2007 | De la Garza Ortega |
| 2007/0057051 A1 | 3/2007 | Bortolin et al. |
| 2007/0083465 A1 | 4/2007 | Ciurea et al. |
| 2007/0094132 A1 | 4/2007 | Waterson et al. |
| 2007/0100691 A1 | 5/2007 | Patterson |
| 2007/0125842 A1 | 6/2007 | Antoo et al. |
| 2007/0194104 A1 | 8/2007 | Fukuda |
| 2007/0203836 A1 | 8/2007 | Dodin |
| 2007/0205270 A1 | 9/2007 | Kemper et al. |
| 2007/0241189 A1 | 10/2007 | Slavin et al. |
| 2007/0244811 A1 | 10/2007 | Tumminaro |
| 2007/0250380 A1 | 10/2007 | Mankoff |
| 2007/0255564 A1 | 11/2007 | Yee et al. |
| 2007/0276764 A1 | 11/2007 | Mann et al. |
| 2007/0288373 A1 | 12/2007 | Wilkes |
| 2008/0003987 A1 | 1/2008 | Mechaley |
| 2008/0006685 A1 | 1/2008 | Rackley, III et al. |
| 2008/0010190 A1* | 1/2008 | Rackley, III ......... G06Q 20/042 705/39 |
| 2008/0021784 A1 | 1/2008 | Hessburg et al. |
| 2008/0033877 A1 | 2/2008 | Blair et al. |
| 2008/0040265 A1 | 2/2008 | Rackley, III et al. |
| 2008/0103972 A1 | 5/2008 | Lanc |
| 2008/0114657 A1 | 5/2008 | Forzley |
| 2008/0120182 A1 | 5/2008 | Arnold et al. |
| 2008/0120231 A1 | 5/2008 | Megwa |
| 2008/0133366 A1 | 6/2008 | Carlson |
| 2008/0140548 A1 | 6/2008 | Csoka |
| 2008/0154727 A1 | 6/2008 | Carlson |
| 2008/0154735 A1 | 6/2008 | Carlson |
| 2008/0163257 A1 | 7/2008 | Carlson |
| 2008/0167991 A1 | 7/2008 | Carlson et al. |
| 2008/0183480 A1 | 7/2008 | Carlson |
| 2008/0183831 A1 | 7/2008 | Shi et al. |
| 2008/0201226 A1 | 8/2008 | Carlson |
| 2008/0208762 A1 | 8/2008 | Arthur et al. |
| 2008/0300973 A1 | 12/2008 | DeWitt et al. |
| 2008/0319843 A1 | 12/2008 | Moser et al. |
| 2009/0076896 A1 | 3/2009 | DeWitt et al. |
| 2009/0076925 A1 | 3/2009 | DeWitt et al. |
| 2009/0078777 A1 | 3/2009 | Granucci et al. |
| 2009/0081990 A1 | 3/2009 | Granucci et al. |
| 2009/0112721 A1 | 4/2009 | Hammad et al. |
| 2009/0119170 A1 | 5/2009 | Hammad et al. |
| 2009/0182634 A1 | 7/2009 | Park et al. |
| 2009/0192912 A1 | 7/2009 | Griffin et al. |
| 2009/0210704 A1 | 8/2009 | Han et al. |
| 2009/0134840 A1 | 12/2009 | Granucci et al. |
| 2009/0319421 A1* | 12/2009 | Mathis ................ G06Q 20/102 705/40 |
| 2009/0327134 A1 | 12/2009 | Carlson et al. |
| 2009/0327151 A1 | 12/2009 | Carlson et al. |
| 2010/0017275 A1 | 1/2010 | Park et al. |
| 2010/0042538 A1 | 2/2010 | Dheer et al. |
| 2010/0094753 A1 | 4/2010 | Carlson et al. |
| 2011/0035319 A1 | 2/2011 | Brand et al. |
| 2011/0040686 A1 | 2/2011 | Carlson et al. |
| 2011/0055077 A1 | 3/2011 | French et al. |
| 2011/0153498 A1 | 6/2011 | Makhotin |
| 2011/0178926 A1 | 7/2011 | Lindelsee |
| 2011/0258111 A1 | 10/2011 | Raj |
| 2011/0258686 A1 | 10/2011 | Raj |

FOREIGN PATENT DOCUMENTS

| | | |
|---|---|---|
| GB | 2348781 A | 11/2003 |
| KR | 10-2002-0020316 A2 | 3/2002 |
| KR | 10-2003-0058010 A | 7/2003 |
| KR | 10-0506913 B1 | 8/2005 |
| WO | 96/13814 A1 | 5/1996 |
| WO | 97/45814 A1 | 12/1997 |
| WO | 99/051038 A1 | 7/1999 |
| WO | 00/003328 A1 | 1/2000 |
| WO | 00/77697 A1 | 12/2000 |
| WO | 04/077369 A1 | 9/2004 |
| WO | 05/052869 A1 | 6/2005 |
| WO | 06/024080 A1 | 3/2006 |
| WO | 08/004217 A2 | 1/2008 |
| WO | 11/133592 A2 | 10/2011 |
| WO | 11/133593 A2 | 10/2011 |
| WO | 11/133594 A2 | 10/2011 |

* cited by examiner

Example Account 1
- Name: Jane Doe
- Mobile #: (123) 555-7777
- CC1: 4xxxxxxxxxxx4444
- Issuer: BankOne
- Personal Alias: worldtraveler
- Issuer Alias: firstbank

502

Example Account 2
- Name: John Doe
- Mobile #: (123) 555-8888
- CC1: 6xxxxxxxxxxx6666
- Issuer:BankTwo
- Personal Alias: beachbum
- Issuer Alias: secondbank

COMMUNICATION DEVICE INCLUDING MULTI-PART ALIAS IDENTIFIER

CROSS-REFERENCES TO RELATED APPLICATIONS

This application is a continuation application of U.S. application Ser. No. 12/437,416, filed May 7, 2009, which claims priority to U.S. Patent Application No. 61/052,028 entitled "Payment System With Push and Pull Requests and Responses" filed on May 9, 2008.

BACKGROUND

The use of consumer devices to conduct financial transactions is growing in popularity. Consumer devices ranging from personal computers to cellular phones can all be used to conduct financial transactions. Various means of using consumer devices to conduct financial transactions have been tried. One of the most common means for conducting a financial transaction involves sending a payment to a payee using the payee's cellular phone number as an identifier. This approach, however, gives rise to several problems. First, the payee must have a cellular phone which is capable of receiving the payments. Second, the payer must know the payee's phone number. As cellular phone numbers tend to change frequently, a payer must make certain that the phone number being used is current. The payer otherwise runs the risk of sending a payment to an unintended third pasty, who has been assigned the intended payee's old phone number. In some cases, the payor and payee may not wish to reveal personal information such as their cellular phone numbers or financial account information to each other. Additionally, the payor and payee may wish for the payment to be sent to or sent from a specific financial account associated with one of the parties to the transaction.

Alias identifiers have been developed to address some of these problems. Alias identifiers are generally described In U.S. patent application Ser. No. 11/767,033, which is hereby incorporated by reference in its entirety for all purposes.

As alias identifiers have become more widely used, some problems with alias identifiers have arisen. In some embodiments, a payment processing network, or other centralized entity, controls the database and server computers used to create alias identifiers and used to resolve alias identifiers during payment transactions. One consequence of this centrally controlled alias identifier system is that financial institutions that manage accounts do not have very much control over the aliases associated with their accounts. Financial institutions have expressed the need to have more control over their aliases and a greater ability to track the aliases associated with their accounts. In the context of a centrally managed system, giving many different financial institutions control over their aliases while at the same time maintaining the integrity of the system can be problematic and needs to be implemented in a fashion that does not cause problems in the system's functionality. An additional problem that has developed for consumers is that if a first consumer creates an alias for their identity, a second consumer cannot create the same alias for their identity even if the second consumer does not have any accounts with the financial institutions of the first consumer.

Embodiments of the invention address these and other problems.

BRIEF SUMMARY

Embodiments of the invention are directed to devices and systems for allowing payments to be made using consumer devices. In some embodiments, the consumer devices used are portable consumer devices, such as mobile phones.

One embodiment is directed towards a consumer device comprising a processor and a network interface configured to send messages from the consumer device. The consumer device also contains a computer readable medium comprising code executable by the processor. The code executable by the processor comprises code for sending a payment request message to a server computer via the network interface. The payment request message includes a request to pay a payee a predetermined amount of money and contains an alias identifier. The alias identifier comprises a first part and a second part, and at least the second part of the alias identifier identities a financial institution of a destination account for the predetermined amount of money. The server computer that receives the payment request message is configured to facilitate the transfer of the predetermined amount of money to the destination account.

Other embodiments of the invention are directed to systems, computer readable media, and methods adapted to implement the above device.

These and other embodiments of the invention are described in further detail below.

BRIEF DESCRIPTION OF THE DRAWINGS

FIG. 2 shows information that can be provided when registering aliases according to an embodiment of the invention.

DETAILED DESCRIPTION

Figure 1:
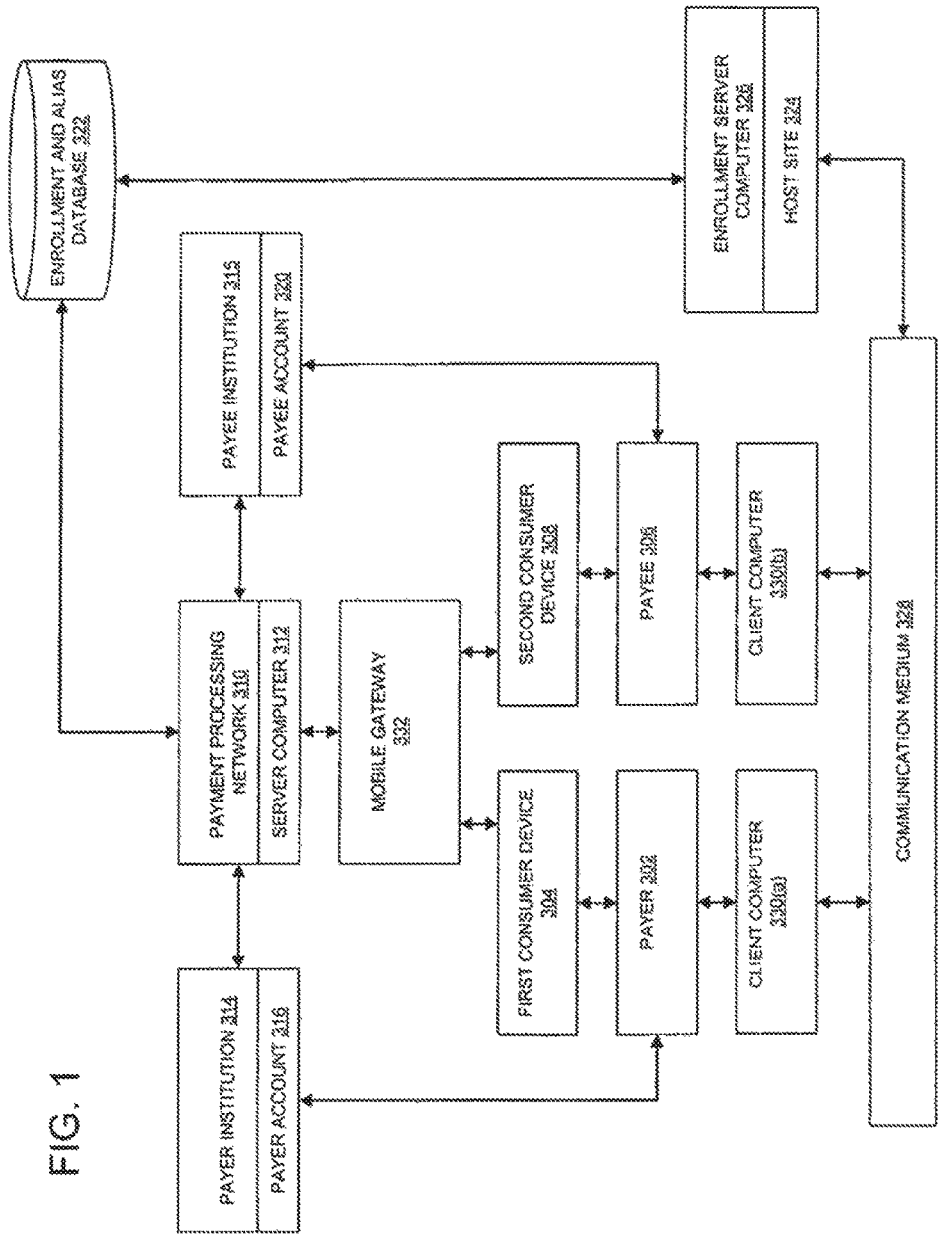
FIG. 1 shows a block diagram of a system according to an embodiment of the invention.

Embodiments of the invention are directed to making person-to-person (P2P) and/or person-to-business (P2B) payments, using consumer devices and portable consumer devices. In embodiments of the invention, a payer may send a payment request message to a payment processing network. The payment request message entitles the desired payee using an alias, which is uniquely associated with the payee.

The alias may have multiple parts, with each part of the alias identifying a relevant aspect of the payment. According to various embodiments, one of the parts of the alias may identify the financial institution of the payer account or the financial institution of the payee account. For example, an alias such as "beachbum.secondbank" contains two parts. The first part of the alias, "beachbum," identifies the potential payer or payee. The second part of the alias, "secondbank" identifies the financial Institution of the account. In some embodiments, "secondbank" is also an entity that manages the alias "beachbum" on databases and servers controlled by an issuer such as BankTwo. BankTwo's alias records may then be periodically synchronized with, alias databases and server computers managed by a central entity, such as a payment processing network. The alias "beachbum.secondbank" may refer to a different payee or payer from the payee or payer associated with the alias "beachbum.firstbank." The alias "beachbum.secondbank" links to an account at BankTwo that is separate from the account linked to by alias "beachbum.firstbank" at BankOne.

One skilled in the art will recognize that there are many potential ways to separate the various parts of an alias. For example, the above examples use the character "." to delimit the various parts of an alias. Alternative deliminiting characters may also be used. Additionally, other well-known means for separating segments of a data string may also be used.

Multi-part alias identifiers yield several advantages over prior alias identifiers. For example, multi-part alias identifiers allow financial institutions to more easily search for and track alias Identifiers associated with their accounts. According to some embodiments, a financial institution may manage the a has identifiers associated with their accounts on server computers controlled by the financial institution. Another advantage of multi-part alias identifiers is that different consumers who have accounts with different financial Institutions can have partially overlapping aliases. For example, "beachbum.firstbank" may refer to a different consumer than "beachbum.secondbank" because the financial institutions behind the account are different.

When a payment request message with an alias is sent from a consumer device to a payment processing network, the payment processing network may then determine the information behind the alias using an enrollment and alias database. According to some embodiments, the alias database accessed may depend on information contained in the alias itself. For example, the alias "beachbum.firstbank" may cause the payment processing network to access an alias database associated with BankOne, while the alias "beachbum.secondbank" may cause the payment processing network to access an alias associated with an alias database associated with BankTwo. The database accessed may be controlled by the payment processing network, or the database accessed may be external to the payment processing network. For example, an accessed database may be controlled by a financial institution.

After determining the information associated with the alias, the payment processing network may then forward the payment request message to a payer institution. The payer institution may be a payer bank and the payer may have a payer account associated with it. The payer institution may thereafter analyze the payment request message and may authorize or not authorize the transaction depending on whether the payer has sufficient credit and/or funds in the payer's account. If the payment request is approved by the payer institution, the payer institution may thereafter transfer funds from the payer's, account at the payer institution to a payee account at a payee institution.

The payment request message may be sent from the payer's consumer device in any suitable manner. In one example, a payer may send the payment request message to the payment processing network via a web page accessed by the phone. A similar web page accessed by a browser running on a personal computer may also be used to send a payment request message. In another example, the payer may send the payment request message to the payment processing network using an SMS message (i.e., a text message). In yet another example, the payer may send the payment request message to the payment processing network using a software application on the phone.

The payment transactions according to embodiments of the invention may take place in any suitable context. For example, suitable payment transactions may involve purchases of goods and services from merchants or individuals in a person to business or person to person context. However, in some embodiments of the invention, a payer may make payments and the payments can be made without any return consideration (e.g., a good or service purchased). For example, a payment may be a gift to the payee or repayment of a debt to the payee where the payer does not receive immediate consideration for the payment.

I. Systems

FIG. 1 shows a system that can be used in an embodiment of the Invention. Embodiments of the invention may use some or all of the components shown in FIG. 1.

The illustrated system includes a payer 302 and a first consumer device 304 associated with the payer 302. The payer 302 has a payer account 316 at a payer institution 314. Similarly, the system includes a payee 306 and a second consumer device 308 associated with the payee 308. The payee 308 has a payee account 320 at a payee institution 315. According to some embodiments, the first consumer device 304 or the second consumer device 308 or both may be portable consumer devices, such as mobile phones. According to some embodiments, the first consumer device 304 or the second consumer device 308 may be typical personal computers.

In this example, the payer institution 314 and payee institution 315 are shown as separate entities. The payer 302 and payee 306 could use the same financial Institution in other embodiments of the invention.

The payer institution 314 and payee institution 315 are typically banks that manage financial accounts for individuals or businesses. However, they could also be business entities such as retail stores.

The payer 302 and payee 306 may be individuals, or organizations such as businesses that are capable of entering into financial transactions (e.g., payment transactions).

The payment processing network 310 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of financial transactions. VisaNet™, in particular, includes a VIP system (Visa Integrated Payments system) which processes authorization requests and a Base II system which performs clearing and settlement services.

The payment processing network 310 may include a payment server computer 312. A "server computer" is typically a powerful computer or duster of computers. For example, a server computer can be a large mainframe, a minicomputer cluster, or a group of servers functioning as a unit. In one example, a server computer may be a database server coupled to a web server. The server computer 312 may form part of any suitable wired or wireless network, including the Internet.

A gateway 332 may be operatively coupled to the payment processing network 310 and may allow the first and second consumer devices 304, 308 to communicate with the payment processing network 310. The gateway 332 may be embodied by any suitable combination of hardware and/or software known to those of ordinary skill in the art.

The system may also comprise a payer client computer 330(a) as well as a payee client computer 330(b). They can be in communication with an enrollment server computer 328 operating a host site 324 (e.g., a Web site), via a communication medium 328. The communication medium 328 may comprise any suitable combination of wired and/or wireless networks including the Internet. The enrollment server computer 328 may store aliases in an enrollment and alias database 322. The payment processing network 310 can subsequently identify the payee 302 and payer 308 using the information stored in the enrollment and alias database 322.

In some embodiments, the enrollment server 326 and host site 324 may be controlled by an organization that operates the payment processing network 310. In other embodiments, financial institutions, such as payee institution 315 and payer institution 314 may host their own enrollment servers and host sites that are used to create aliases for their consumers. In these embodiments, the financial institution's hosted enrollment server and host site allows financial institutions to more closely track and control the aliases created for their accounts. For example, financial institutions may maintain databases of alias accounts separate from Enrollment and Alias Database 322. Alias information created by the financial institution's hosted enrollment server and host site can then be synchronized with the Enrollment and Alias Database 322, either periodically or on a real-time basis, so that the aliases are available for use by consumers. Aliases that are synchronized between financial institutions and the Enrollment and Alias Database 322 may be multipart aliases with at least one part of the multipart alias identifying the financial institution of the consumer's account.

Payers and payees may also create aliases for other pieces of information that might be used in a payment request message. For example, a payee may assign various aliases for a variety of financial accounts held by the payee. The payee can then instruct a payer to send funds to the payee to one of the payee's accounts using the created account alias. The payer can then include the account alias in the payment request, message sent to the payment processing network, and the payment processing network can attempt to send funds from the payer to the financial account of the payee as indicated by the payee account alias. In other embodiments, there can be a separate enrollment database and a separate alias database. In some embodiments, the alias database stores aliases that identify the payer, payee, financial accounts, and other information. In some embodiments, different types of aliases are stored in different databases. In some embodiments, the first and second consumer devices may be the same as the payer client computer 330(a) and the payee client computer 330(b).

Additional details on the components, subsystems, and devices represented in the embodiment illustrated in FIG. 1 are given in more detail later in this disclosure.

II. Enrollment Methods

In embodiments of the invention, payers and payees may first enroll in the system. The payee and the payer may enroll in any suitable manner. For example, referring to FIG. 1, the payee and the payer may enroll in the system via the host site 324 using the client computers 330(a), 330(b). Enrollment information such as name, account number, etc. may be stored by the server computer 326 in the enrollment and alias database 322. This information can be used in subsequent payment processes to identify the payer 302 or the payee 306.

In some cases, a financial institution such as the payee institution 315 or the payer institution 314 may "push" pre-enrollment data to the enrollment and alias database 322. The payer institution 314, for example, may validate the payer 302 ahead of time. The payer institution 314 may do this ahead of time, because it knows the payer 302 and the payer's credit history and account balance information.

After the payer 302 is enrolled in the system, the payer 302 may set up an appropriate alias or part of the alias to use the system. According to some embodiments, the alias set up the payer may constitute one part (e.g., a personal alias) of a multi-part alias while information identifying the financial institution (e.g., an issuer alias) may make up another part of a multi-part alias. In other embodiments, the payer may set up only one part of the alias (e.g., the personal alias) while the other part of the alias (e.g., the issuer alias) is set up by another entity (e.g., an issuer). The same may be true for the payee 306. Thus, in some embodiments, the payer 302 need not do anything to enroll and need only set up one or more parts of her payment alias.

In some embodiments, a financial institution such as the payee Institution 315 or the payer institution 314 may push fell enrollment data to the enrollment and atlas database 322. An institution, such as a financial institution, may do this on a periodic basis or in real-time. The payer institution 314, for example, may allow the payer 302 to create an alias or part of the alias for their account on server computers and databases separate from the enrollment and alias database 322, the enrollment server computer 326, or the host site 324 represented in FIG. 1. The alias information created by the payee institution 315 or the payer institution 314 can then be pushed to the enrollment and alias database 322 so that the alias information is available to process payment request messages. The aliases pushed to the enrollment and alias database 322 may automatically be associated with the appropriate financial institution so that alias collisions between financial institutions cannot occur. For example, the aliases or parts of aliases pushed to the enrollment and alias database 322 may be useable as a multi-part alias such as "beachbum.secondbank." Embodiments that allow financial institutions to create aliases give these institutions greater control on the alias creation process. Each institution can give their creation process a unique look and feel, and each institution can also easily apply any relevant rules they wish to use to control how aliases are created and how they are associated with accounts.

Referring to FIG. 2, Jane registers personal information 502 including her name, mobile telephone number, a credit card account number (CC1), and a personal alias, which may be a first part of the alias to be formed. In this example, the account, number associated with credit card 1 (CC1) is associated with the financial institution "BankOne." John may similarly register his personal information 504 in a similar manner. In this example, Jane creates the personal alias part, "worldtraveler," while John creates the personal alias pa a "beachbum." These alias parts may have been created or selected by the user using the enrollment server computer 326, or the host site 324, or they may have been created by systems managed by a financial institution and then pushed to the enrollment and alias database 322.

In this example, the aliases created by Jane and John have different issuers (e.g., BankOne, and BankTwo). In FIG. 2, Jane and John have each created their own issuer alias. Jane has created the issuer alias "firstbank" for issuer "BankOne," and John has created the issuer alias "secondbank" for issuer "BankTwo." In some embodiments, the payer and the payee may have to select from a predefined list of possible issuer aliases so that the list of possible issuer aliases is confined.

In embodiments of the invention, a number of alias parts may be used in addition to an issuer alias and a personal alias. Alias parts may include payment processing organization alias parts for the payment processing organization that operates the payment processing network An example of a service provider alias may be "myvisa" for a payment processing organization such as Visa.

Figure 3:
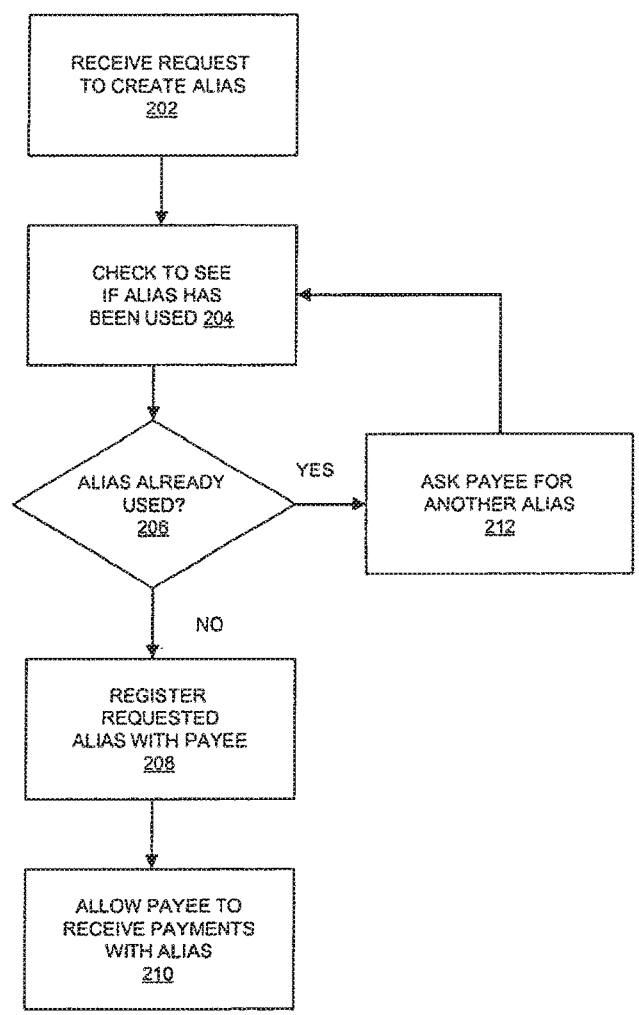
FIG. 3 shows a flowchart Illustrating an alias registration process according to an embodiment of the invention.

Referring to FIGS. 1 and 3, in the first step 202, a payee 306 requests assignment of an alias or a part of an alias. In some embodiments, the payee 308 may specify a particular alias part. However, in other embodiments, a payment processing organization may assign an alias part to the payee 306. To register an alias, the payee 306 may use the client computer 330(b) to contact the host site 324 on the server computer 328. The host site 324 may comprise a wizard or other mechanism to allow the payer 302 and the payee 306 to enter information. In some embodiments, payees and payers may enter information into a host site managed by a financial institution and the financial institution can then synchronize the Information they receive with the enrollment and alias database 322.

In the next step 204, the server computer 326 checks the enrollment and alias database 322 to see if the requested alias (or alias part) is already being used by another payee or payer. If the requested alias already exists, then the payee 306 may be asked to provide another alias (step 212). Alternatively or additionally, the requested alias may only be rejected if the alias already exists with the financial Institution of one of the accounts held by the payee 306. In some embodiments, financial institutions may have specific rules for accepting or rejecting aliases that will be associated with the financial institution. For example, some aliases may create an objectionable multi-part alias when combined with some financial institution identifier but not with other financial institution identifiers. Financial institutions can set up rules specific to their needs to help manage the aliases that are associated with financial institutions. In some embodiments, an alias may be rejected as already existing only if the aliases are associated with accounts held by the same financial institution.

If the alias (or part thereof) has not been previously registered, then the server computer 328 may register the requested alias for the payee 208. This information may be stored In the enrollment and alias database 322. Once the alias has been registered for the payee 308, the payment processing organization may begin allowing the payee to receive payments made using the alias (step 210). The alias may comprise a first part that corresponds to a personal alias and a second part that corresponds to an issuer alias. In the enrollment and alias database 322, the first part of the alias may be mapped to the payee's (or payor's) account number (which is in turn linked to the payee's name and address. In some embodiments, information from the enrollment and alias database 322 may then be forwarded to the appropriate financial institution so that the financial institution is aware of the created alias and can better track the aliases associated with accounts managed by the financial institution.

This method and other related embodiments of the invention allow for efficient cross-Institution payments to be made, by uniquely identifying an individual, business, financial institution, etc., via an alias. The aliases may be associated with many accounts or services operated by an individual or entity, if desired. In some embodiments, the various aliases can be registered for a fee, and consumers may be charged a registration and renewal fee for using certain aliases. Other embodiments may provide the enrollment: and alias database as a free service, or charge only certain classes of entitles (e.g. charge only payees, or for-profit corporations).

III. Payment Methods

Figure 4:
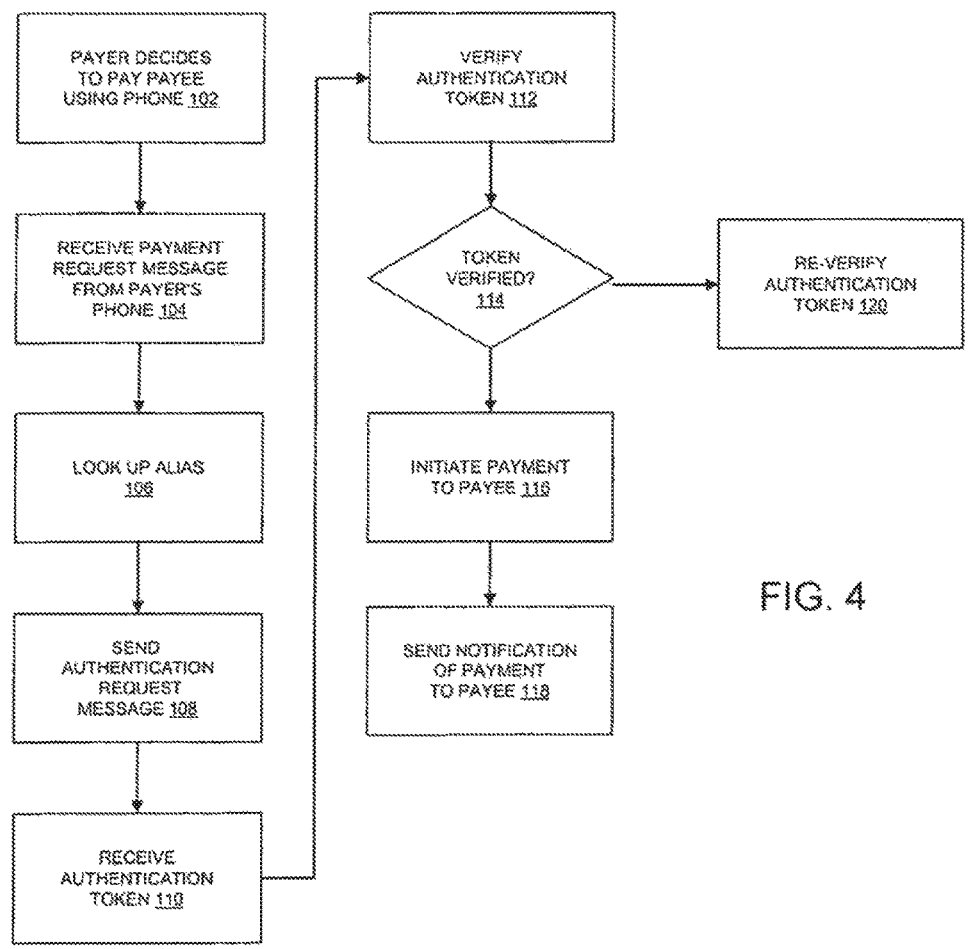
FIG. 4 shows a flowchart illustrating a payment method according to an embodiment of the invention.

FIG. 4 shows a flowchart illustrating a payment method according to an embodiment of the invention. In the first step 102 the payer 302 decides to pay the payee 306 using the first consumer device 304. The first consumer device 304 may be a phone operated by the payer 302.

A payer 302 then uses the first consumer device 304 and sends a payment request message to the payment processing network 310 and the payment processing network 310 receives the payment request message (step 104). The payment request message comprises at least a payment amount and an alias. The alias may further comprise more than one part, such as personal alias and an issuer alias.

As noted above, the payment request message may take a variety of different forms. For example, the payment request message could foe in the form of an SMS message. The request could also come in the form of an email, or a voice interaction with an IVR unit. The request could also be made via a software application on the phone, which sends one or more network packets containing the request data.

In the next step 100, using the enrolment and atlas database 322, the server computer 312 in the payment processing network 310 analyses the payment request message and uses the phone number of the payee (or an alternative payee alias) in the payment request message to identify the payee 306. Other information, such as the payer institution 314 and the payer account 316 may also be identified.

For example, the payment request message for a payment of $10 may comprise information including "pay $10 to beachbum.secondbank." The first part (e.g., beachbum) of the alias (beachbum.secondbank) can be mapped to a payee's account number (e.g., 6xxxxxxxxxxx6666), while the second part (e.g., second-bank) of the alias can be mapped to the payee's issuer (e.g., BankTwo). The payer 302 may be automatically identified by the server computer In the payment processing network 310, by an appropriate caller ID or other type of identification mechanism. The payers phone number (e.g., (123) 555-7777) can be identified by the server 312 in the payment processing network 310 and the server 312 can determine the payer's account number including a payer account number (4xxxxxxxxxxx4444) and payer issuer (e.g., BankOne). The payer's information linking the payer's phone number and issuer account number may have been previously stored in the enrollment and alias database 322, As explained earlier, payer information may have been "pushed" into the enrollment and alias database 322 as pre-enrollment data by a financial institution.

To provide security to the system, an optional authentication request message is sent from the payment processing network to the first consumer 304 operated by the payer 108. The authentication request message may be Initialed by the payer institution 314 or by a payment processing organization affiliated with the payment processing network 310. It may request entry of a password, or personal information such as an address or social security number to verify the identity of the payer 108. The authentication request message may take a variety of forms, as described for the payment request message 104 above. In preferred embodiments, the authentication request message will be sent to the payer's consumer device 304. It could also be sent to the payer's client computer 330(a).

In the next step 110, the payer 302 provides an authentication token to the payment processing network 310. For example, the payer 302 may enter a PIN (personal identification number) into the first consumer device 304 and may then send the authentication token back to the payment processing network 310, and the payment processing network 310 may or may not forward it to the payer institution 314. Other examples of authentication tokens include passwords, birthdates, and other personal information associated with the payer 382.

The payment processing network 310 (or the payer institution 314) then verifies the authentication token 112. If the authentication token is invalid, the payment request in the payment request message may be rejected. Alternatively, the payment processing network 310 may re-verify the authenticate token (step 120) by sending another authentication request message to the payer 302 via the first consumer device 304.

If the payer 302 and/or the first consumer device 304 are authenticated and after the real payer 302 and the payee 308 are determined, the payment processing network 310 may send the payment request message to the payer institution 314 for approval. The payment request message may be re-formatted to remove various aliases and may include the real information. For example, the server computer 312 in the payment processing network 310 may analyze the message "pay $10 to beachbum.secondbank" from phone number (123) 555-7777 is a request from Jane Doe to pay John Doe $10 from credit card account no. 4xxxxxxxxxxx4444 to credit card account number 6xxxxxxxxxxx6666. An appropriate payment message is then sent to the payer Institution 314. The payer institution 314 may then approve of the payment request if there are sufficient funds and/or credit in the payer account 310 or disapprove it if there are insufficient funds or credit. If the payment request is approved, at some point in time (e.g., immediately or at the end of the day if clearing and settling need to take place), actual funds may be transferred from the payer account 318 to the payee account 320 via the payment processing network 310.

Once the funds have been transferred from the payer account 318 to the payee account 320, a payment notification message may sent to the consumer device 308 and/or the client computer 330(b) operated by the payee 118 after the payment request In the payment request message has been approved by the payer institution 314.

In a specific example, a payer 302 such as Jane and a payee 306 such as John register on the host site 324 run on a remote server computer 328 using their client computers 330(a), 330(b).

After registering, a payment processing organization may provide both John and Jane with a phone number for the service that will facilitate further payment processing. In other embodiments, the payment processing organization may provide John and Jane with a service alias instead of or in addition to the service phone number. For example, instead of providing John and Jane with the service phone number 555-555-5555, the payment processing organization may provide the service alias "myvisa" to John and Jane. The service alias may be referred to as a "short-code" in some cases, and may include a string of characters of variable length.

In an exemplary transaction, Jane may be a payer 302 and wants to pay $15.00 to a payee 398 named John. Payer Jane 362 initiates a payment to John by entering the payment request message "myvisa pay beachbum.secondbank $15.00" into her consumer device 304, and sending the message via SMS to the server computer 312 in the payment processing network 310 via the mobile gateway 332. The alias "beachbum" is used instead of John's phone number. The service alias "myvisa" is used instead of the phone number of the service. The financial institution alias "secondbank" identifies the financial institution of the account owned by John where the payment will be deposited.

In some embodiments, Jane may also use a portable consumer device alias such as "CC2" (not shown) to indicate the particular credit card that Jane wants to use to pay John. For example, payee Jane 302 may enter the payment request message "myvisa pay beachbum.secondbank $15.00 CC2" into her consumer device 304 to indicate that a second credit card owned by Jane (not illustrated in FIG. 2) and issued by BankOne (or another issuer) Is to be used to make the intended payment. Jane may alternatively or additionally designate a default credit card account number.

After entering the payment request message "myvisa pay beachbum. secondbank $15.00 CC2" into her consumer device 304, the payment request message is sent from her consumer device 304 to the payment processing network 310 (e.g., as described above), and then (in this example) to an financial institution of the credit card (or other portable consumer device). In this example, the financial Institution of the credit card may be the payer institution 314.

The payment processing network 310 may receive the payment request message and may then optionally respond by sending an authentication request message to the payer 302. In this example, an authentication request message is sent in the form of a call from an interactive voice response unit (IVR) at a telecom server or the like, which asks payer Jane 302 to enter her mobile PIN (personal identification number) 510. After payer Jane 302 enters the correct PIN into her consumer device 304, the payer institution 314 and/or the server computer 312 in the payment processing network 310 can then attempt to resolve the alias used by payer Jane 302 to determine where the payment request message needs to be sent In order to process the payment. For example, the payer institution 314 and/or the server computer 312 in the payment processing network 310 may access the enrollment and alias database 322 to lookup the alias "beachbum.secondbank."

Next, the payer institution 314 and/or the server computer 312 in the payment processing network 310 can then analyze the payment request message and reformat it so that it is sent to the payer institution 314 for approval or decline. If the payment request is approved, appropriate funds may be transferred to the payee account 320 at the payee institution 315. For example, payee John's portable consumer device account (e.g., credit card account) at John's bank (e.g., the payee institution, i.e., BankTwo, 315) can be credited with the payment amount. Payer Jane's account 316 can be subsequently debited for the payment amount.

In some embodiments, a payment notification message in the form of an SMS, e-mail, or some other type of message may be sent to the payee's consumer device 308, informing the payee John 306 that a payment from the payee John 302 has been made. In one embodiment, the payment notification message may be sent to payee John's consumer device 308. The payment notification message could be sent to the client computer 330(b) operated by the payee John 306. A payment notification message could also be sent to the payer Jane 302 on Jane's consumer device 304 or Jane's client computer 330(a).

According to some embodiments, the payment notification message may include a payment confirmation code. For example, the payment confirmation code may be a number such as "123456789." Either the payer 302 or payee 308 can then enter this number into their consumer device or client computer to receive more Information on the payment. For example, Jane 302 could enter the received payment, confirmation code into a web site configured to accept such codes. The web site would then return a page to Jane 302 informing Jane that "You made a payment or $15,00 to beachbum.secondbank on 1-1-09." Similarly, John could use the same code to receive a similar message. One skilled in the art will recognize that the code could also be used in an SMS message or any other appropriate communication message to achieve similar functionality. In some embodiments, this confirmation code could also be used by the financial institution of either Jane's or John's account to retrieve information about the transaction.

Embodiments of the invention have a number of advantages. First, the use of an alias allows for a transaction to be completed while keeping the personal information of the transacting parties confidential. This is useful because, for example, a payer may net want to disclose his or her phone number to a payee, or vice versa. Second, the alias allows for payments to be made even if a payee's telephone number or financial account changes. A payer may thus store a list of aliases for payees with whom the payer frequently does business, and may initiate repeated payments without having to verify that the payee's telephone number is the same. Third, aliases tend to be much easier to remember than either phone numbers or financial account numbers. Consequently, embodiments of the invention will be easier to use than other methods. Fourth, embodiments of the invention allow for many accounts to be accessed from a single mobile phone, eliminating the need to carry a large number of portable consumer devices. Fifth, multi-part aliases allow financial institutions to better track aliases associated with their accounts. For example, an financial institution may use the alias database to easily identify their consumers with aliases and then the financial institution can analyze the use of the aliases, payment requests, or any other relevant pieces of information. Sixth, a multi-part alias allows multiple consumers to potentially share the same alias so long as the aliases are associated with different financial Institutions. This allows consumer to have greater flexibility in their aliases choices and leads to greater consumer satisfaction.

IV. Exemplary Computer Apparatuses and Consumer Devices

Figure 5:
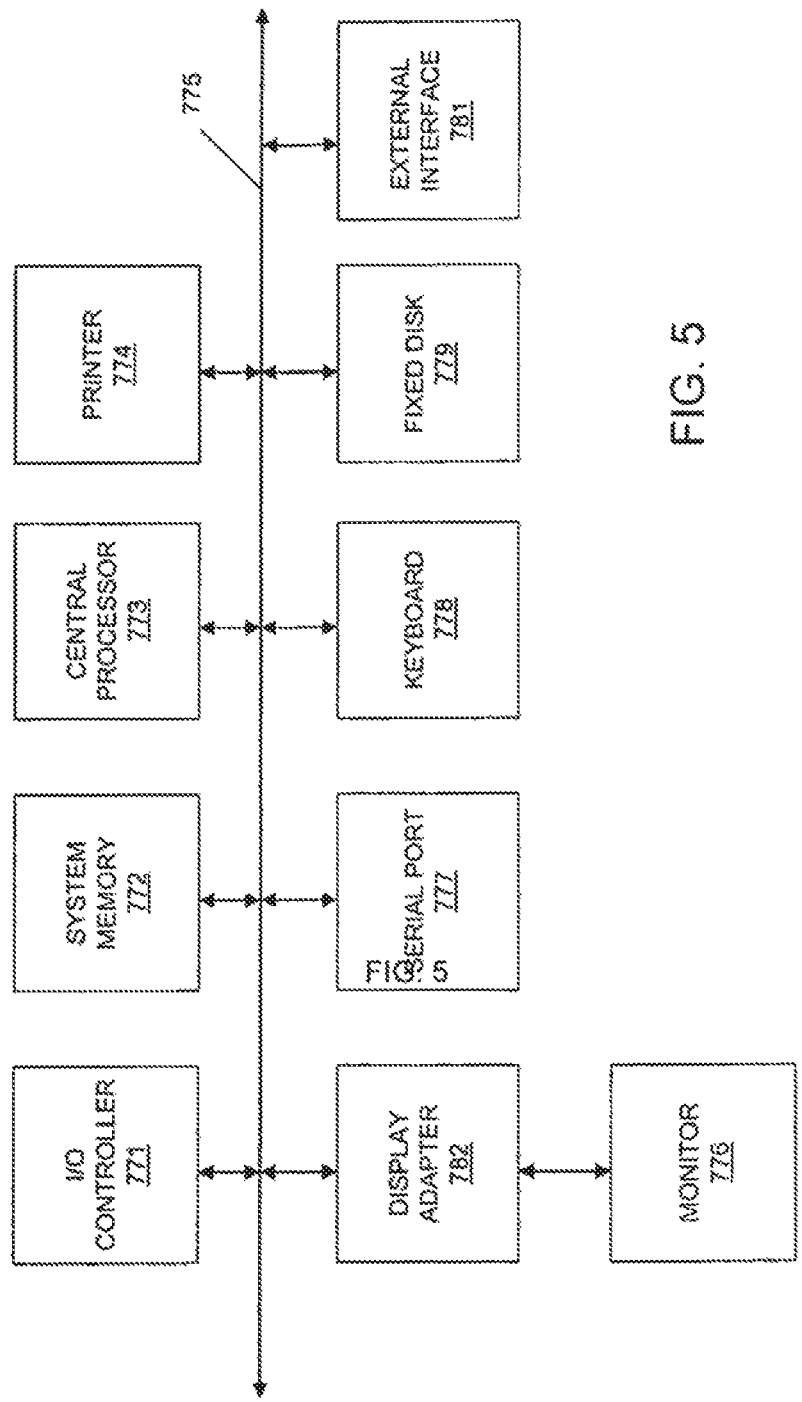
FIG. 5 shows a block diagram of the components in a computer that can be used according to embodiments of the invention.

FIG. 5 shows typical components or subsystems of a computer apparatus. Such components or any subset of such components may be present in various components shown in FIG. 1, including the payment server computer 312, the enrollment server computer 326, the client computers 330(*a*), 330(*b*), consumer devices 304, 308, etc. The subsystems shown in FIG. 2 are interconnected via a system bus 775. Additional subsystems such as a printer 774, keyboard 778, fixed disk 779, monitor 776, which is coupled to display adapter 782, and others are shown. Peripherals and input/ output (I/O) devices, which couple to I/O controller 771, can be connected to the computer System by any number of means known in the art, such as serial port 777. For example, serial port 777 or external interface 781 can be used to connect the computer apparatus to a wide area network such as the Internet, a mouse input device, or a scanner. The interconnection via system bus 775 allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

Figure 6:
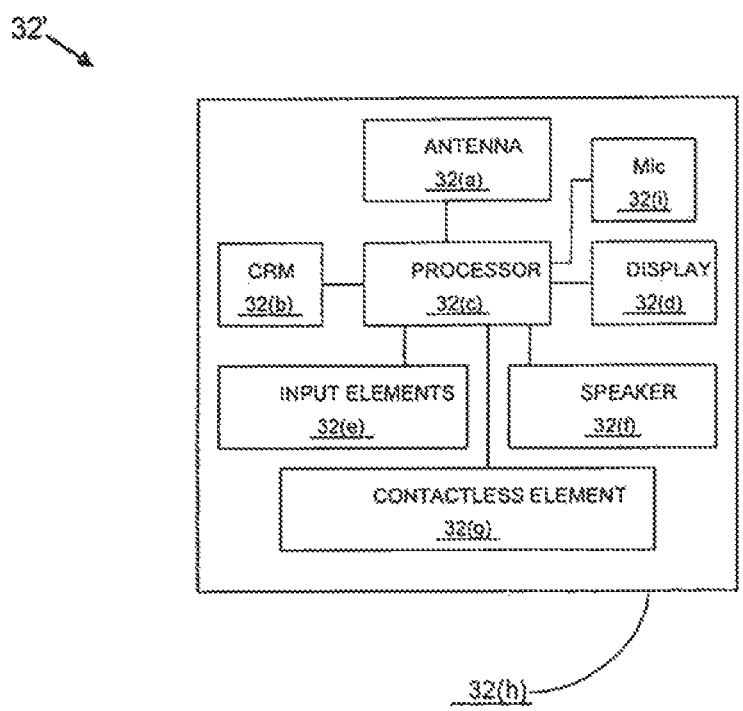
FIG. 6 shows a block diagram of components in a portable consumer device that can be used according to embodiments of the invention.

FIG. 6 shows a block diagram of some components of the first consumer device 304 in the form of a portable consumer device. In some embodiments, the first consumer device may be a portable consumer device, such as a mobile phone.

Some or all of the components In the first consumer device 304 may also be present in the second consumer device 308 (illustrated in FIG. 1).

The portable consumer device 32 may comprise a computer readable medium 32(*b*) and a body 32(*h*) as shown in FIG. 8. The computer readable medium 32(*b*) may be present within body 32(*h*), or may be detachable from it. The body 32(*h*) may be in the form a plastic substrate, housing, or other structure. The computer readable medium 32(*b*) may be a memory that stores data and may be in any suitable form including a magnetic stripe, a memory chip, etc.

The computer readable medium 32(*b*) may comprise code for performing any of the functions described herein. For example, it may comprise code for sending a payment request message using a consumer device to a payment processing network, where the payment request message comprises an amount of money to be paid and an alias, where the alias is associated with a payee; code for receiving in response to the payment request message an authentication request message, where the authentication request message is received via the portable consumer device; and code for sending an authentication token In response to the authentication request message.

The portable consumer device 32 may further include a contactless element 32(*g*), which is typically implemented In the form of a semiconductor chip (or other data storage element) with an associated wireless transfer (e.g., data transmission) element, such as an antenna. Contactless element 32(*g*) is associated with (e.g., embedded within) portable consumer device 32 and data or control instructions transmitted via a cellular network may be applied to contactless element 32(*g*) by means of a contactless element interface (not shown). The contactless element interface functions to permit the exchange of data and/or control instructions between the mobile device circuitry (and hence the cellular network) and an optional contactless element 32(*g*).

Contactless element 32(*g*) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-feel, or other data transfer capability that can be used to exchange data between the portable consumer device 32 and a payment processing network 28 or it can be used to exchange data between the portable consumer device 32 and an access device (e.g., a POS terminal). Thus, the portable consumer device 32 is capable of communicating and transferring data and/or control instructions via both cellular network and near field communications capability.

The portable consumer device 32 may also include a processor 32(*c*) (e.g., a microprocessor) for processing the functions of the portable consumer device 32 and a display 32(*d*) to allow a payee to see phone numbers and other Information and messages. The portable consumer device 32 may further include input elements 32(*e*) to allow a payee to input Information into the device, a speaker 32(*f*) to allow the payee to hear voice communication, music, etc., and a microphone 32(*i*) to allow the payee to transmit her voice through the portable consumer device 32. The portable consumer device 32 may also include an antenna 32(*a*) for wireless data transfer (e.g., data transmission).

Any of the above-described methods or steps of such methods may be embodied as software code to be executed by a processor of the server computer or any other suitable combination of devices using any suitable computer language such as, for example, Java, C++ or Perl using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

It should be understood that the present invention can be implemented in the form of control logic, in a modular or integrated manner, using software, hardware or a combination of both. Based on the disclosure and teachings provided herein, a person of ordinary skill in the art will appreciate other ways and/or methods to implement the present invention.

Any of the above-described embodiments and/or any features thereof may be combined with any other embodiment(s) and/or feature(s) without departing from the scope of the invention.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

What is claimed is:

1. A server device, comprising:
a processor device; and
a memory including instructions that, when executed with the processor device, cause the server device to, at least:
receive, over a network interface via a wireless communication, a payment request from a payer consumer device, wherein the payment request includes an indication of a predetermined amount of money and a multi-part alias identifier comprising a first part alias identifier and a second part alias identifier;
identifying, based on the first part alias identifier, a payee to which the payment request is directed, the payee identified based on a mapping between the first part alias identifier and a payee account number stored in the memory of the server device;
identifying, based on the second part alias identifier, a financial institution to which the payment request is directed, the financial institution identified based on a mapping between the second part alias identifier and a financial institution identifier stored in the memory of the server device;
identifying a payer account associated with the payer consumer device;
providing, to the payer, a computer generated communication to confirm the payment request for the predetermined amount of money to the identified payee;
upon confirming the request to pay the payee the predetermined amount of money, generating a payment request message that includes at least the payer account number and the predetermined amount of money;
sending the generated payment request message to a payer institution for approval;
receiving approval for the payment request message from the payer financial institution, and
facilitating payment of the predetermined amount of money from the payer financial institution to the payee financial institution using the payee account number, the payer, account number, and the predetermined amount.

2. The server device of claim 1, wherein the payment request message received over the network interface is an SMS message.

3. The server device of claim 1, wherein the payment request message comprises at least a payee account number and a payee financial institution.

4. The server device of claim 1, wherein the computer generated communication is an IVR callback.

5. The server device of claim 4, wherein the instructions further cause the server device to:
receive a PIN in response to the IVR callback; and
verify the PIN before generating the authorization request.

6. The server device of claim 1, wherein the instructions further cause the server device to send a confirmation message to at least one of the payer or the payee after sending the generated authorization request to the payer institution.

7. The server device of claim 1, wherein the instructions further cause the server device to facilitate a transfer of the predetermined amount of money.

8. The server device of claim 1, wherein the facilitating the transfer of the predetermined amount of money comprises:
requesting the predetermined amount of money from the payer account; and
sending the predetermined amount of money to a payee account associated with the payee account number.

9. The server device of claim 1, wherein the payer account number is a credit card account number.

10. The server device of claim 1, wherein the payer account number is a bank account number.

11. A consumer device, comprising:
a processor; and
a memory including instructions that, when executed with the processor, cause the consumer device to, at least:
receive, a request to complete a payment from a payer, the request comprising at least a multi-part alias and an amount of currency, the multi-part alias comprising a first part alias identifier and a second part alias identifier;
identify an account associated with the payer;
transmit the received request and an indication of the identified account to a server device, such that the server device is caused to:
identify, based on the second part alias identifier, a financial institution to which the request is directed, the financial institution identified based on a mapping between the second part alias identifier and a financial institution identifier stored in the memory of the server device;
identify a payee account number maintained by the identified financial institution based on a mapping between the first part alias identifier and the payee account number stored in the memory of the server device; and
initiate a payment in the amount of currency from the account associated with the payer to a payee account associated with the payee account number maintained by the identified financial institution; and receive, from the server device, a confirmation that the request has been completed.

12. The consumer device of claim 11, wherein the request comprises only the multi-part alias and the amount of currency.

13. The consumer device of claim 11, wherein the request is routed to the identified financial institution via a payment processing network.

14. The consumer device of claim 11, wherein the account associated with the payer is identified based on a payment account stored in memory of the consumer device.

15. The consumer device of claim 11, wherein the instructions further cause the consumer device to prompt a user of the consumer device for a PIN prior to transmitting the received request and the indication of the identified account to the server device.

16. The consumer device of claim 11, wherein the server device is operated on behalf of a payment processing network.

17. The consumer device of claim 11, wherein initiating the payment comprises generating a transaction request message that includes the amount of currency and an indication of the account associated with the payer.

18. The consumer device of claim 17, wherein the instructions further cause the consumer device to submit the generated transaction request message to a payment processing network to be routed to a second financial institution associated with the account associated with the payer.

19. A computer-implemented method comprising:
  receiving, at a consumer device, a request to complete a payment from a payer, the request comprising at least a multi-part alias and an amount of currency, the multi-part alias comprising at least a first part alias identifier and a second part alias identifier;
  identifying an account associated with the payer;
  transmitting, from the consumer device to a server device, the received request and an indication of the identified account, wherein the server device is configured to (i) identify, based on the second part alias identifier, a financial institution to which the request is directed, the financial institution identified based on a mapping between the second part alias identifier and a financial institution identifier stored in the memory of the server device,
  identify a payee account number associated with the identified financial institution based on a mapping between the first part alias identifier and the payee account number stored in the memory of the server device, and
  initiate a payment in the amount of currency from the account associated with the payer to a payee account associated with the payee account number; and
  receiving, at the consumer device from the server device, a confirmation that the request has been completed.

20. The computer-implemented method of claim 19, wherein the server device is further configured to:
  subsequent to identifying the payee account number, send a confirmation message to the consumer device; and
  receive from the consumer device, a response to the confirmation message, wherein the payment is initiated based upon the received response.

* * * * *